US008385992B2

(12) United States Patent
Davidson et al.

(10) Patent No.: US 8,385,992 B2
(45) Date of Patent: Feb. 26, 2013

(54) USER INTERFACES AND ASSOCIATED APPARATUS AND METHODS

(75) Inventors: Brian Davidson, Surrey (GB); Ricky Barnett, Hertfordshire (GB)

(73) Assignee: Nokia Corporation, Espoo (FI)

( * ) Notice: Subject to any disclaimer, the term of this patent is extended or adjusted under 35 U.S.C. 154(b) by 698 days.

(21) Appl. No.: 12/339,386

(22) Filed: Dec. 19, 2008

(65) Prior Publication Data

US 2010/0159993 A1  Jun. 24, 2010

(51) Int. Cl.
*H04M 1/00* (2006.01)

(52) U.S. Cl. .................. 455/575.4; 455/575.1; 361/629; 361/679.21; 361/679.55

(58) Field of Classification Search ............... 455/575.4, 455/575.1; 361/629, 679.21, 679.55
See application file for complete search history.

(56) References Cited

U.S. PATENT DOCUMENTS

| | | | |
|---|---|---|---|
| 6,295,038 B1 | 9/2001 | Rebeske | |
| 6,381,128 B1 | 4/2002 | Kramer | |
| 6,748,249 B1 | 6/2004 | Eromaki et al. | |
| 7,330,548 B2 | 2/2008 | Kim et al. | |
| 7,574,241 B2 * | 8/2009 | Ahn et al. ................... | 455/575.1 |
| 7,577,466 B2 * | 8/2009 | Kim ............................. | 455/575.4 |
| 7,930,009 B2 * | 4/2011 | Todune ....................... | 455/575.4 |
| 7,986,983 B2 * | 7/2011 | Harmon et al. ............ | 455/575.4 |
| 8,014,845 B2 * | 9/2011 | Murakoso et al. ......... | 455/575.4 |
| 8,032,192 B2 * | 10/2011 | Park ............................ | 455/575.4 |
| 8,046,037 B2 * | 10/2011 | Jang ........................... | 455/575.4 |
| 8,081,449 B2 * | 12/2011 | Lin et al. .................... | 361/679.56 |
| 8,086,290 B2 * | 12/2011 | Yoon et al. ................. | 455/575.4 |
| 8,107,235 B2 * | 1/2012 | Yeh ........................... | 361/679.56 |
| 8,160,660 B2 * | 4/2012 | Tashiro ....................... | 455/575.4 |
| 8,164,890 B2 * | 4/2012 | Wu et al. .................... | 361/679.21 |
| 8,170,632 B2 * | 5/2012 | Hsu ............................. | 455/575.4 |
| 8,190,219 B2 * | 5/2012 | Park et al. .................. | 455/575.4 |
| 2001/0034250 A1 | 10/2001 | Chadha | |
| 2003/0206394 A1 | 11/2003 | Ossia | |
| 2005/0052835 A1 | 3/2005 | Wu et al. | |
| 2005/0085273 A1 | 4/2005 | Khalid et al. | |
| 2005/0143137 A1 | 6/2005 | Matsunaga et al. | |
| 2006/0183505 A1 | 8/2006 | Willrich | |

(Continued)

FOREIGN PATENT DOCUMENTS

DE  203 18 035 U1  2/2004
EP  1 148 692 A2  10/2001

(Continued)

OTHER PUBLICATIONS

Office Action for European Application No. 09 809 375.0 dated Mar. 20, 2012.

(Continued)

*Primary Examiner* — Linh Nguyen
(74) *Attorney, Agent, or Firm* — Alston & Bird LLP

(57) ABSTRACT

Apparatus for a portable electronic device, the apparatus comprising a base member, a user input interface, and a user output interface. The user output interface is configured to extend along mutually perpendicular longitudinal and lateral axes of the apparatus. The user input interface comprises a QWERTY input configured to extend parallel to the longitudinal axis. The apparatus is configured to provide a first configuration in which the user input interface is housed between the base member and the user output interface, and a second configuration in which the user input and output interfaces have been laterally slid in opposing directions with respect to the base member.

25 Claims, 6 Drawing Sheets

U.S. PATENT DOCUMENTS

| | | | |
|---|---|---|---|
| 2006/0197753 A1 | 9/2006 | Hotelling | |
| 2006/0211454 A1 | 9/2006 | Park et al. | |
| 2007/0037618 A1 | 2/2007 | Lee | |
| 2007/0046561 A1 | 3/2007 | Cheon et al. | |
| 2007/0065220 A1 | 3/2007 | Kemppinen | |
| 2007/0075915 A1 | 4/2007 | Cheon et al. | |
| 2007/0076861 A1 | 4/2007 | Ju | |
| 2008/0051041 A1* | 2/2008 | Griffin et al. | 455/90.3 |
| 2008/0161075 A1* | 7/2008 | Kim et al. | 455/575.4 |
| 2008/0207273 A1 | 8/2008 | Huo | |
| 2008/0225014 A1 | 9/2008 | Kim | |
| 2008/0244452 A1 | 10/2008 | Kum | |
| 2009/0009423 A1 | 1/2009 | Huang et al. | |
| 2009/0093285 A1* | 4/2009 | Weng et al. | 455/575.4 |

FOREIGN PATENT DOCUMENTS

| | | |
|---|---|---|
| EP | 1 313 297 A1 | 5/2003 |
| EP | 1594289 | 11/2003 |
| EP | 1722538 | 11/2006 |
| EP | 1 950 937 A2 | 7/2008 |
| EP | 2 034 700 A1 | 3/2009 |
| GB | 2 350 516 A | 11/2000 |
| GB | 2407933 | 5/2005 |
| WO | WO 00/79372 A1 | 12/2000 |
| WO | WO 03/081880 A1 | 10/2003 |
| WO | WO 2005/034485 | 4/2005 |
| WO | WO 2006/034309 | 3/2006 |
| WO | WO 2007/140911 | 12/2007 |
| WO | WO 2008/101519 A | 8/2008 |

OTHER PUBLICATIONS

Supplementary European Search Report for Application No. 09 809 375.0 dated Mar. 2, 2012.
Office Action for Russian Application No. 2011111183/08(016515) dated Jun. 1, 2012.
International Search Report and Written Opinion for Application No. PCT/FI2009/050646 dated Nov. 6, 2009.
International Search Report for Application No. PCT/EP2008/061439 dated May 4, 2009.
Plica phone concept with dual screen display [online] [retrieved Nov. 21, 2008]. Retrieved from the Internet: <URL: http://www.slippertybrick.com/2008/07/plica-hone-concept-with-dual-screen-display>. 2 pages (dated Jul. 30, 2008).
LG KF600 Slider Dual Display Handset [online] [retrieved Nov. 21, 2008]. Retrieved from the Internet: <URL: http://allaboutmobilz.blogspot.com/2008/05/lg-kf600-slider-dual-display-handset.html>. 2 pages (dated May 30, 2008).
Office Action from Korean Patent Application No. 2011-7007082 dated Aug. 27, 2012.
Office Action for U.S. Appl. No. 12/339,351 dated Jul. 20, 2011.
Office Action for U.S. Appl. No. 12/339,351 dated Jan. 31, 2012.
Office Action for European Application No. 08 803 425.1 dated Feb. 29, 2012.
Office Action for European Application No. 09 809 374.3 dated Mar. 20, 2012.
Office Action from Chinese Patent Application No. 200980133374.8 dated Oct. 10, 2012.

* cited by examiner

USER INTERFACES AND ASSOCIATED APPARATUS AND METHODS

TECHNICAL FIELD

The present disclosure relates to the field of user interfaces, and more particularly, to apparatus having a plurality of user interfaces that are exposed when the apparatus is in different configurations, associated methods, computer program products and apparatus.

Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND OF THE INVENTION

Mobile telephones are known that include a top layer, a middle layer and a bottom layer that are slidably suspended from one another. The top layer can move between a retracted position in which a first keypad on the middle layer is covered and to a first extended position in which the first keypad is exposed. The top layer can also move to a second extended position in which a second keypad on the middle layer is exposed. Such a layered mobile device is disclosed in WO 2007/140911 (Nokia Corporation).

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY OF THE INVENTION

In a first aspect, there is provided apparatus for a portable electronic device, the apparatus comprising a base member, a user input interface, and a user output interface configured to extend along mutually perpendicular longitudinal and lateral axes of the apparatus, the user input interface comprising a QWERTY input configured to extend parallel to the longitudinal axis, the apparatus configured to provide a first configuration in which the user input interface is housed between the base member and the user output interface, and a second configuration in which the user input and output interfaces have been laterally slid in opposing directions with respect to the base member.

The QWERTY input may be activated for use on the user input interface when the apparatus is in the second configuration, and may not be activated for use when the apparatus is in the first configuration. This can provide efficient use of overheads/resources, including power consumption as the user input interface may not use power when it is unavailable for use, for example when it is concealed from a user of the apparatus.

In a further aspect, there is provided apparatus for a portable electronic device, the apparatus comprising a base member, a user input interface and a user output interface, the user output interface configured to provide portrait and landscape modes of use, the apparatus configured to provide a first configuration in which the user input interface is housed between the base member and the user output interface with the user output interface providing the portrait mode of use, and a second configuration in which the user input and output interfaces have been slid in opposing directions with respect to the base member and the user output interface provides the landscape mode of use.

Providing apparatus with user interfaces in this way can provide a convenient and efficient use of the user interfaces in different modes of operation. In addition, the apparatus may be economically sized and proportioned and still be capable of efficiently displaying information to a user and enabling a user to interact with the apparatus.

The apparatus may comprise mutually perpendicular longitudinal and lateral axes. The user input interface may comprise a QWERTY input configured to extend parallel to the longitudinal axis. The apparatus may be configured such that, in the second configuration, the user input and output interfaces have been slid along the lateral axis. The QWERTY input of the user input may be for use with the landscape mode of use of the user output interface.

The user output interface may be configured to align user output for viewing in an orientation in which the top of the user output is aligned with the longitudinal axis in the portrait mode of use.

The user output interface may be configured to align user output for viewing in an orientation in which the top of the user output is aligned with the lateral axis in the landscape mode of use.

The apparatus may comprise a motion coupler coupled between the user input interface and the user output interface. The motion coupler may be configured to apply a force to the user input interface when an external force is applied to the user output interface to change the configuration of the apparatus. The force applied to the user input interface may be in the opposite direction to the force applied to the user output interface.

The motion coupler may comprise one or more rack and pinion mechanisms. The one or more rack and pinion mechanisms may be geared such that one of the user interfaces is configured to move faster than the other user interface.

The motion coupler may comprise:
a first pin connected to the base;
a second pin connected to the user input interface; and
a lever pivotally connected to the user output interface, wherein the lever comprises one or more slots configured to accommodate the first and second pins, such that movement of the lever about its pivot point as the apparatus changes configuration causes movement of the user input interface and user output interface in opposite directions.

The apparatus may comprise two motion couplers, one on each side of the first and second parts.

The user output interface may be configured to conceal all of the user input interface, or substantially all of the user input interface, when the apparatus is in the first configuration.

All, or substantially all, of the user output interface may be exposed when the apparatus is in the first configuration.

The base member may also be known as a housing, the user input interface may be associated with a first part of a device, and the user output interface may be associated with a second part of a device.

The apparatus may have three layers, a first layer comprising the base member/housing, a second layer comprising the user input interface/first part, and a third layer comprising the user output interface/second part.

The first layer may be a bottom layer, the second layer may be a middle layer, and the third layer may be a top layer. The top, middle and bottom locations may be defined in relation to the depth of the device when it is in an in-use orientation. In some embodiments, the depth of the device may be considered as a Z direction, and the layers may be displaced relative to each other in the Z direction.

In some embodiments, the footprint of the base member, first part and second part may all be of a similar size. The footprint may be considered as the shape of a part in a lateral and longitudinal direction, which may also be known as the X and Y directions. Providing the base member, first part and second part with a similar footprint can enable a mono-block form-factor to be achieved when the apparatus is in the first configuration. A mono-block form-factor may be a mechanically strong form-factor.

Both the user input interface and the user output interface may overhang the base member when the apparatus is in the second configuration. Approximately half of the user input interface may overhang a first side of the base member when the apparatus is in the second configuration. Approximately half of the user output interface may overhang a second side of the base member when the apparatus is in the second configuration.

In some embodiments all, or only part, of the area of user interfaces associated with an apparatus can be exposed with a reduced travel of the first and second user interfaces relative to the base member. This can provide a mechanically strong/robust form-factor.

The user output interface may be configured to provide portrait and landscape modes of use. The first configuration may provide the portrait mode of use. The second configuration may provide the landscape mode of use.

In the second configuration, the user input and output interfaces have been slid along the lateral axis and the QWERTY input of the user input may be for use with the landscape mode of use of the user output interface.

The user output interface may be configured to align user output for viewing in an orientation in which the top of the user output is aligned with the longitudinal axis in the portrait mode of use.

The user output interface may be configured to align user output for viewing in an orientation in which the top of the user output is aligned with the lateral axis in the landscape mode of use.

The user input interface and user output interface may be configured such that they can be tilted relative to each other to define a third configuration, wherein the third configuration is a further landscape mode of use. In some embodiments, in the third configuration, the user input interface and the user output interface may be exposed.

The user input interface may be an input and output interface, and may comprise a touch sensitive screen. The user output interface may be an input and output interface, and may comprise a touch sensitive screen.

According to a further aspect, there is provided apparatus for a portable electronic device, the apparatus comprising a base member, a user input interface, and a user output interface, the apparatus configured to provide a first configuration in which the user input interface is housed between the base member and the user output interface, and a second configuration in which the user input and output interfaces have been slid in opposing directions with respect to the base member to both overhang the base member.

The apparatus may comprise mutually perpendicular longitudinal and lateral axes, and in the second configuration, the user input and output interfaces have been slid along the lateral axis.

The base member may provide support for the user input and output interfaces in the second configuration.

There may be provided a device comprising an apparatus disclosed herein.

There may be provided a module for a device, the module comprising an apparatus disclosed herein.

There may be provided a method of assembling an apparatus disclosed herein.

There may be provided a method of assembling a device disclosed herein.

According to a further aspect, there is provided an apparatus for a portable electronic device, the apparatus comprising a base member means, a means for receiving user input, and a means for providing user output configured to extend along mutually perpendicular longitudinal and lateral axes of the apparatus, the means for receiving user input comprising a QWERTY input means configured to extend parallel to the longitudinal axis, the apparatus configured to provide a first configuration in which the means for receiving user input is housed between the base member means and the means for providing user output, and a second configuration in which the means for receiving user input and the means for providing user output have been laterally slid in opposing directions with respect to the base member means.

There may be provided an apparatus comprising:
 a housing;
 a first part comprising a first user interface;
 a second part comprising a second user interface; and
 a motion coupler coupled between the first part and the second part;
 wherein the apparatus is configured such that the first part and second part are laterally slidable relative to each other, and also laterally slidable relative to the housing, to define first and second configurations;
 the second user interface being exposed and the first user interface being concealed by the second part, when the apparatus is in the first configuration;
 the first and second user interfaces being exposed when the apparatus is in the second configuration;
 wherein the motion coupler is configured to apply a force to the second part when an external force is applied to the first part to change the configuration of the apparatus, wherein the force applied to the second part is in the opposite direction to the force applied to the first part.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which.

DESCRIPTION OF SPECIFIC ASPECTS/EMBODIMENTS

Embodiments described herein include apparatus having a user input interface and a user output interface. In some embodiments, the user input interface is associated with a first part of a device and the user output interface is associated with a second part of the device. The user input interface and user output interface are slidable relative to each other, and also relative to a base member of the device to define first and second configurations of the apparatus.

The user input interface can include a QWERTY input that can extend laterally from the apparatus in order to provide convenient apparatus for receiving user input when the apparatus is in the second configuration.

The user output interface can provide portrait and landscape modes of use dependent upon the configuration of the user input interface and the user output interface. In a first configuration, the user input interface is housed between the base member and the user output interface, and the user output interface provides a portrait mode of use. In a second configuration, the user input and output interfaces have been slid in opposing directions with respect to the base member and the user output interface provides the landscape mode of use.

Providing the user interfaces in this way can enable the apparatus to be used in a relatively compact first configuration whereby the base member, user input interface and user output interface are provided all on top of each other. The apparatus can also be used in the second configuration wherein the user input interface and user output interface have been slid apart to increase the total user interface area. The second configuration may be mechanically robust as the base member may support both of the user input interface and user output interface.

Apparatus described herein can provide a portable electronic device with a robust form-factor both in an "open" and "closed" configuration.

Figure 1A:
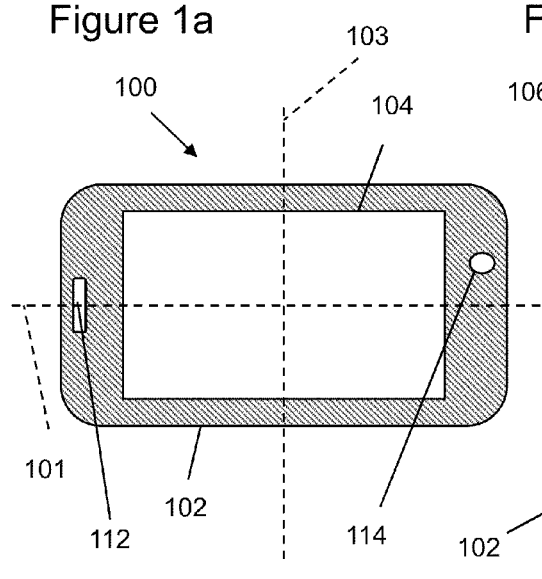
FIGS. 1a-1c illustrate a device according to an embodiment of the invention.
Figure 1B:
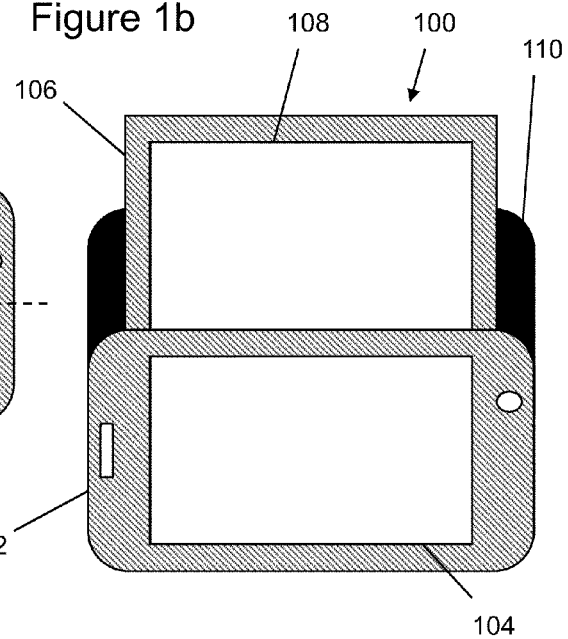
Figure 1C:
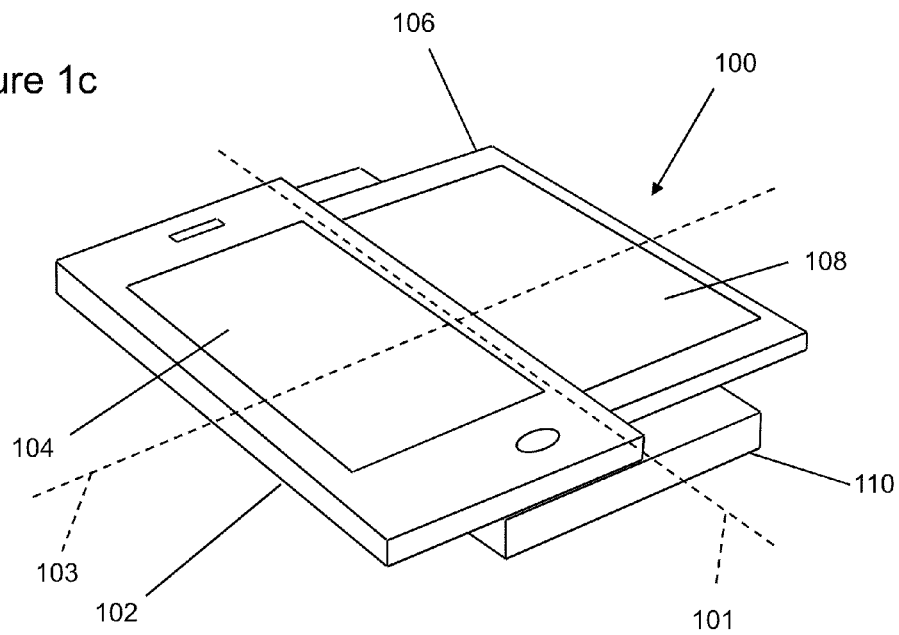

FIG. 1 illustrates three different views of a portable electronic device 100 according to an embodiment of the invention. In this embodiment, the device 100 is a mobile telephone. FIG. 1a shows a plan view of the device 100 in a first/closed configuration, FIG. 1b shows a plan view of the device 100 in a second/open configuration, and FIG. 1c shows a perspective view of the device 100 in the second/open configuration.

When the device is in the closed configuration as in FIG. 1a, a first user output interface 104 is visible to a user. The first user output interface 104 is located on a first part 102 of the device. The first part 102 is positioned above a second part (not shown in FIG. 1a, but shown as reference 106 in FIG. 1b), which is positioned above a base member (not shown in FIG. 1a, but shown as reference 110 in FIG. 1b). The first part substantially covers the second part 106, which substantially covers the base member 110. When the device 100 is in the closed configuration, it has a mono-block form-factor, and can be used for making and receiving calls using the microphone 114 and speaker 112. The device 100 may also have physical push buttons (not shown in this embodiment) on the first part 102 for operating the device.

In the first configuration, the user input interface 108 is housed between the base member 110 and the user output interface 104. In this embodiment, the user output interface may be configured for a portrait mode of use, as may be considered typical for a mono-block form-factor mobile telephone. The portrait mode of use may be considered as one where the information displayed on the user output interface 104 runs from top to bottom along a longitudinal axis 101 of the device.

FIGS. 1b and 1c show the device 100 in a second, open configuration. In order to transition from the first configuration to the second configuration, the first and second parts 102, 106 are laterally slid apart relative to each other, and at the same time, the two parts 102, 106 are laterally slid away from a base member 110.

When the device 100 is in the open configuration, the first user output interface 104 on the first part 102 is visible to a user, and a second user input interface 108 on a second part 106 of the device 100 is also visible to the user. The second user interface 108 has been exposed/uncovered from beneath the first part 102.

As can be seen more clearly in FIG. 1c, the first part 102 and the second part 106 of the device 100 are slid apart relative to a base member 110 in order to expose the second user interface 108 from underneath the first part 102.

The user output interface 104 may be configured for a landscape mode of use when the device is in the second/open configuration. This may be a convenient layout for displaying information to a user of the device 100 whilst they can provide input to the device via the user input interface 108. The landscape mode of use may be considered as one where the information displayed on the user output interface 104 runs from side to side along a lateral axis 103 of the device, that is the user output interface moves parallel to axis 101.

It will be appreciated that the user input and output interfaces 104, 108 described herein can each be configured for both input and output, and may include a display screen, a touch sensitive display screen, a QWERTY keyboard, one or more buttons that can be pressed by a user, and any combination thereof.

Although not illustrated in FIG. 1, it will be appreciated that the device 100 may have a controller that can provide output to cause information to be displayed on one or more of the user input and output interfaces 104, 108.

The controller may have one or more inputs configured to receive a signal from a transducer representative of the configuration of the device. For example, the output signal of the transducer may provide an indication of whether the device 100 is in an open or closed configuration. A first operating mode may be associated with the device being in a first configuration, and a second operating mode may be associated with the device being in a second configuration.

FIG. 2 illustrates a device 150 according to a further embodiment of the invention. The device comprises a base member 160, on top of which is slidably mounted a second part 154 having a user input interface, on top of which is slidably mounted a first part 152 having a user output interface 156.

Figure 2A:
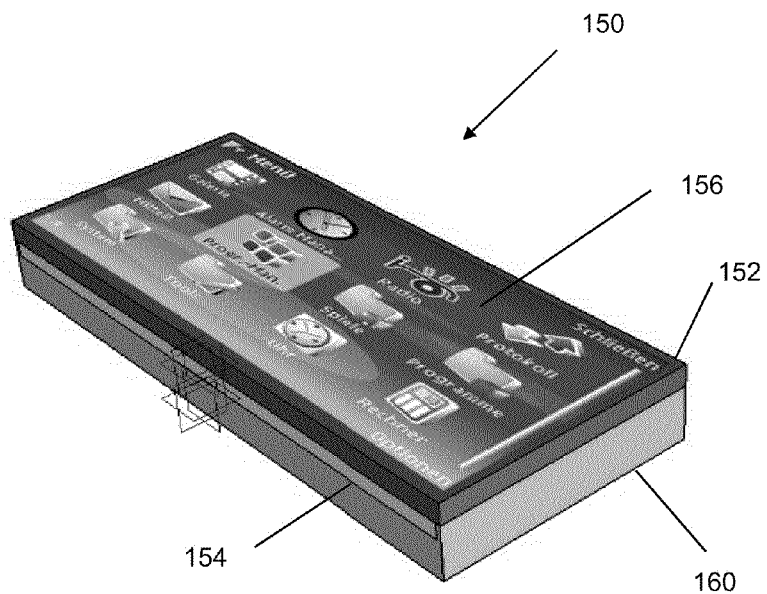
FIGS. 2a-2b illustrate a device according to another embodiment of the invention.

FIG. 2a shows the device 150 in a closed configuration, whereby the base member 160, second part 154 and first part 152 are all stacked on top of each other such that the base member 160 and first part 152 house the second part 152. In particular, the first part 152 conceals a user interface 158 associated with the second part 154.

Each of the base member 160, second part 154 and first part 152 have similar lateral and longitudinal dimensions, which may be considered as dimensions in the X and Y direction, such that the closed configuration represents a mono-block form factor. Although in this embodiment, a user output interface 156 associated with the first part 152 displays information to a user in a landscape orientation, other embodiments of the user output interface 156 may be configured to display information to a user in a portrait orientation.

Figure 2B:
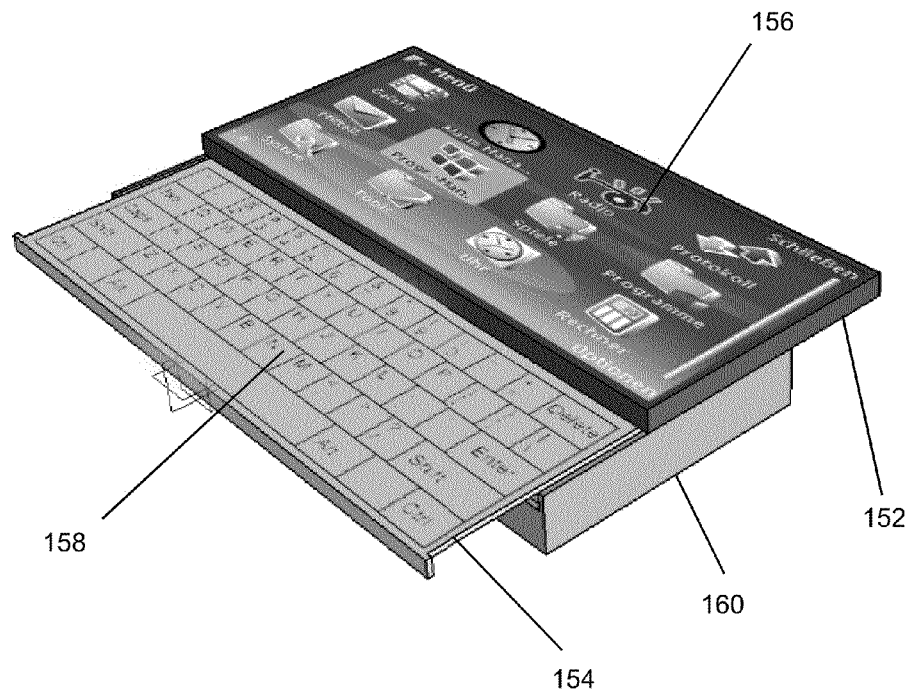

FIG. 2b shows the device 150 in an open configuration. When the device 150 is in the open configuration, the second part 154 and first part 152 have been laterally slid in opposing directions relative to the base member 160. In this way a user input interface associated with the second part 154 has been exposed, and in this example the user input interface is a QWERTY keyboard 158. The QWERTY keyboard may be displayed on a touch sensitive screen, or may comprise physical push buttons. A QWERTY input may be known as a keymat.

As the first part 152 and second part 154 have been slid apart, they are both still supported by the base member 160. In this embodiment, approximately half of each of the first and second parts 152, 154 overhang the sides of the base member 160 such that the other halves of the first and second parts 152, 154 are still located over the base member 160 such that they can benefit from the mechanical support offered by the base member 160.

In this example, the device 150 has a lateral width of 50 millimeters, and each of the first and second parts have a lateral distance of travel of 20 millimeters in order to expose the user interface associated with the second part.

Further advantages associated with embodiments of the invention can include that at least one user interface is always visible to a user, and therefore the user can view information on a user interface, and in some embodiments provide input through the user interface, independent of the configuration of the device. This can provide the user with flexibility to expose and obscure different user interfaces depending upon their needs. For example, if they want to view more than one set of information at the same time, but doing so on a single user interface would not be possible/would not provide sufficient resolution, then they can change the configuration of the device so that two user interfaces are visible. The second user interface could also be exposed by opening the device when a user wants to run a different application to that being displayed on the first user interface.

As will be described in relation to the embodiments of a mechanism illustrated in FIGS. 3 and 4, in order for a user to change the configuration of a device according to embodiments of the invention, they need only apply a force to the first part 102 of the device 100 in the desired direction. When such an external force is applied by a user, a motion coupler according to an embodiment of the invention is configured to cause the second part 106 of the device 100 to move in the opposite direction to the first part 102. In this way, the motion coupler may be considered as applying an internal force to the second part 106 of the device 100 when an external force is applied to the first part 102 of the device 100.

FIG. 3 illustrates an embodiment of a motion coupler/mechanism according to an embodiment of the invention. In this example, the motion coupler is a rack and pinion mechanism.

Figure 3A:
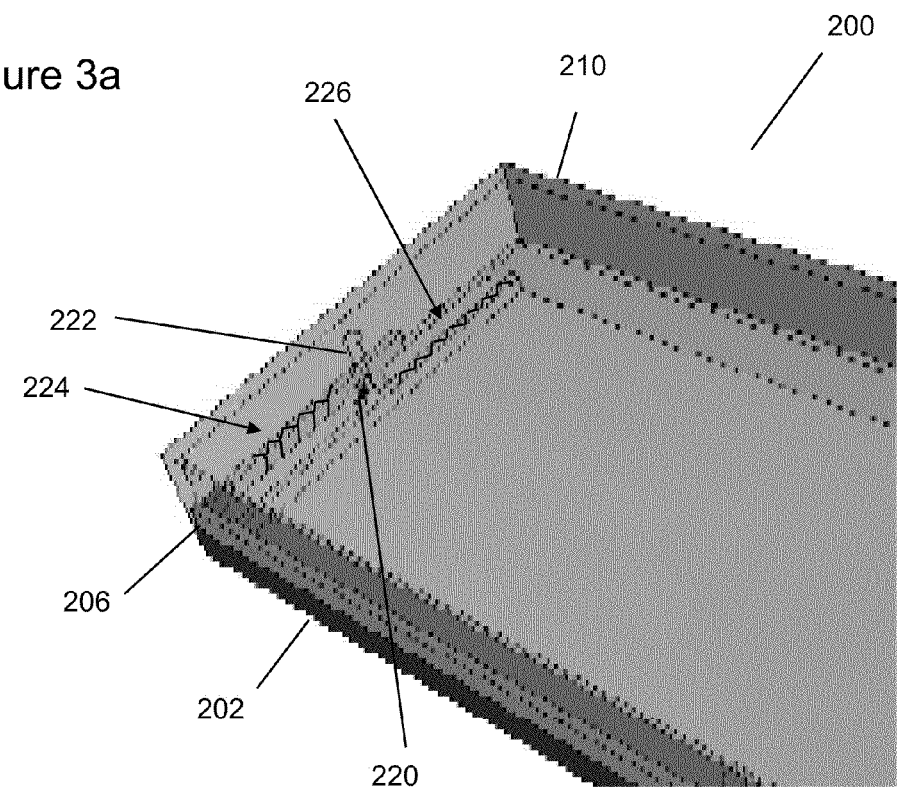
FIGS. 3a-3c illustrate a mechanism according to an embodiment of the invention.

The device 200 illustrated in FIG. 3a includes a base member 210, a first part 202 and a second part 206. The device 200 illustrated in FIG. 3 is shown upside down compared to an in-use orientation in order to better illustrate the mechanism.

The base member 210 is shown on top of the device 200 in FIG. 3.

The mechanism/motion coupler comprises a gear wheel/pinion 220 mounted on a pin 222, and the pin 222 is attached to the base member 210. The gear wheel 220 can freely rotate around the pin 222 as the configuration of the device 200 changes. The mechanism also comprises a first rack portion 224 that is associated with the first part 202 of the device 200 and is configured to engage/mesh the gear wheel 220 on one side. The mechanism also includes a second rack portion 226 that is associated with the second part 206 of the device 200 and is configured to engage/mesh the gear wheel 220 on the opposite side to the first rack portion 224. It will be understood that movement of one rack portion will therefore cause movement of the other rack portion.

Figure 3B:
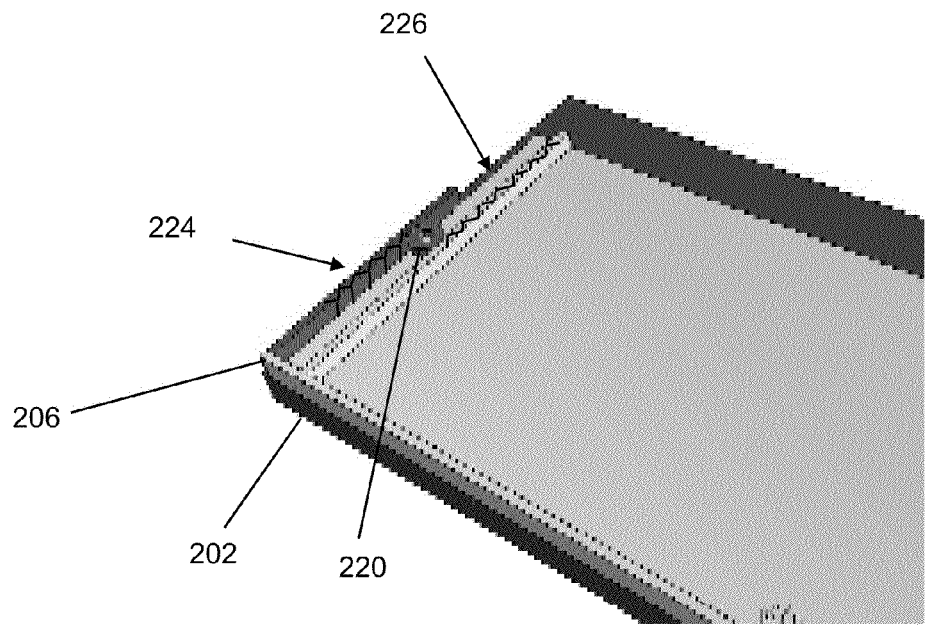

FIG. 3a illustrates the base member 210, first part 202 and second part 206 of the device 200 in a closed configuration wherein the base member 210, first part 202 and second part 206 are all located on top of each other. FIG. 3b also illustrates the device 200 in a closed configuration, but this time the base member 210 (and associated pin 222) is not shown in order to better illustrate the mechanism in use.

Figure 3C:
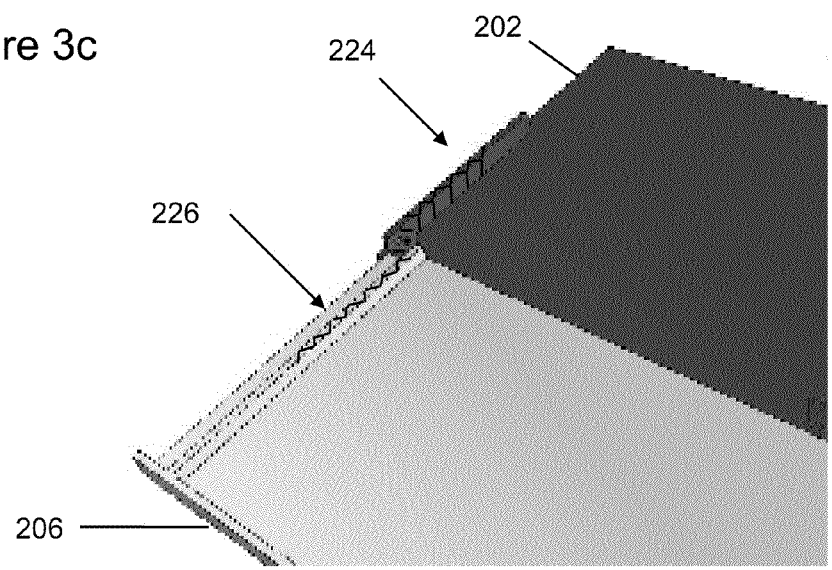

FIG. 3c illustrates the apparatus of FIG. 3b in an open configuration. In order to change the configuration of the device from the closed configuration illustrated in FIG. 3b to the open configuration illustrated in FIG. 3c, the user applies a force to the first part 202 to move the first part 202 away from the base member 210 in a lateral direction. A user applied force may be considered as an external force.

The user applied force causes the first rack portion 224 to move past the gear wheel 220, thereby causing the teeth of the first rack portion 224 to rotate the gear-wheel. As described above, the gear-wheel 220 is also engaged with the second rack portion 226 associated with the second part 206 such that as the gear-wheel 220 rotates, the second rack portion 226 moves in the opposite direction to the first rack portion 224, thereby causing the second part 206 to move in the opposite direction to the first part 202.

The rack and pinion mechanism may be considered as applying an internal force to the second part 206 as the first rack portion 224 associated with the first part 202 moves past the gear-wheel 220.

In some examples, a single gear may be used such that the two modules/parts (which may be a display and keymat) move at the same rate. In other embodiments, more than one interlocking or concentric gears can be used to change the ratio of travel of the two modules/parts.

FIG. 4 illustrates a further embodiment of a motion coupler/mechanism fitted to a device 300 according to an embodiment of the invention.

Figure 4A:
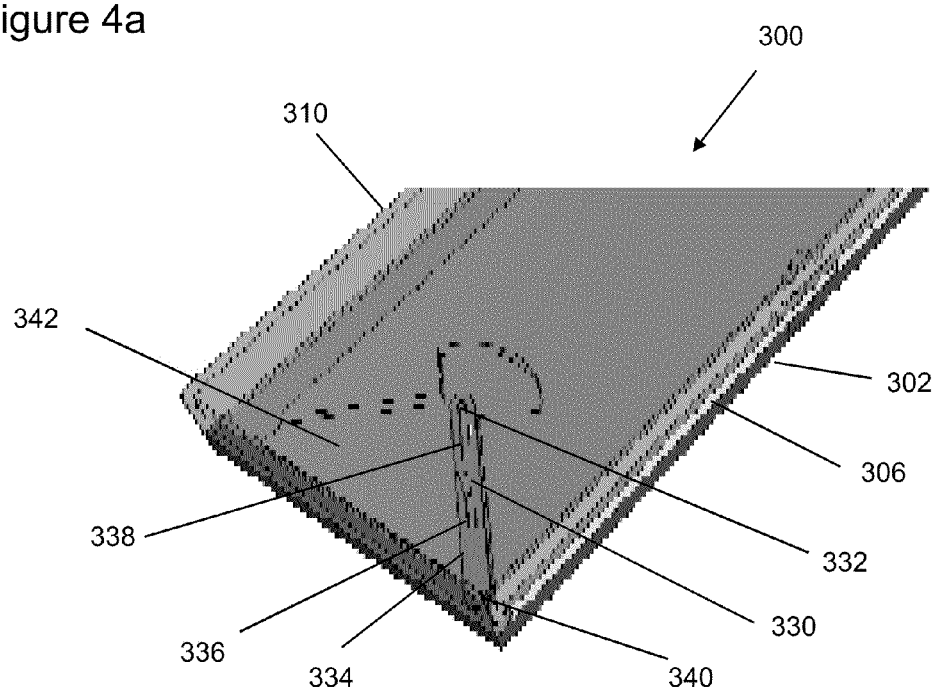
FIGS. 4a-4d illustrate a further embodiment of a mechanism according to an embodiment of the invention.

FIG. 4a shows the device 300 with the base member 310, first part 302 and second part 306 all visible. In order to more closely show operation of the mechanism, FIGS. 4b, 4c and 4d do not include the base member 310 and its associated pin (330).

The mechanism includes a first pin 330 that is connected to the base member 310. The first pin 330 is configured to maintain a desired position of the base member 310 relative to the first part 302 and the second part 306 of the device 300 in operation. In this example, the base member 310 is kept in the middle (in a lateral direction) of the first and second parts 302, 306. The base member 310 can provide support for the two parts 302, 306, especially when the device 300 is in the open configuration, and providing the base member centrally with regard to the first and second parts 302, 306 can enable the maximum offset/overhang of the two parts 302, 306 in relation to the base member 310 to be reduced, and in some embodiments to be kept to a minimum whilst still providing full exposure of the user interfaces associated with the first and second parts 302, 306.

In some embodiments, the apparatus can enable all of the user interface associated with the second part 306 to be exposed in the open configuration without requiring undue overhang of the first and second parts 302, 306 over the sides of the base member 310. Reducing the overhang can improve the mechanical strength of the device 300.

The mechanism also includes a second pin 332 that is connected to the second part 306 of the device 300.

Pivotally connected to the first part 306 of the device 300 is a lever 334. The lever 334 is pivotally connected at pivot point 340 to a corner of the first part 302. The lever 334 is pivotally connected to the first part such that it is positioned between the second part 306 and the housing 310 so that it can interact with the first and second pins 330, 332 as described below. In some embodiments, the second part 306 is smaller than the first part 302 such that the lever 334 can be pivotally connected to a region of the first part 302 that overlaps the second part 36.

In this embodiment, the second part 306 is longitudinally shorter than the first part 302 and the lever 334 is pivotally connected to a corner of the first part 302 that is at a longitudinal end of the first part 302 that overlaps a longitudinal end of the second part 306. In this way the lever can be located on top of (in FIG. 4) the second part 306 such that it is located between the second part 306 and the base member 310.

The second part 306 includes a cut-out region 342 that confines the scope of movement of the lever 334. The cut-out region 342 is etched into the second part 306 to provide a recess in which the lever 334 can move, as discussed below.

The lever 334 has a first longitudinal slot 336 that accommodates the first base member pin 330 in use, and a second longitudinal slot 338 that accommodates the second part pin 332. It will be appreciated that the slots, 336, 338 in the lever 334 can accommodate movement of the pins 330, 332 along the length of the slots as the configuration of the device 300 is changed and the lever 334 pivots about its pivot point 340.

Figure 4B:
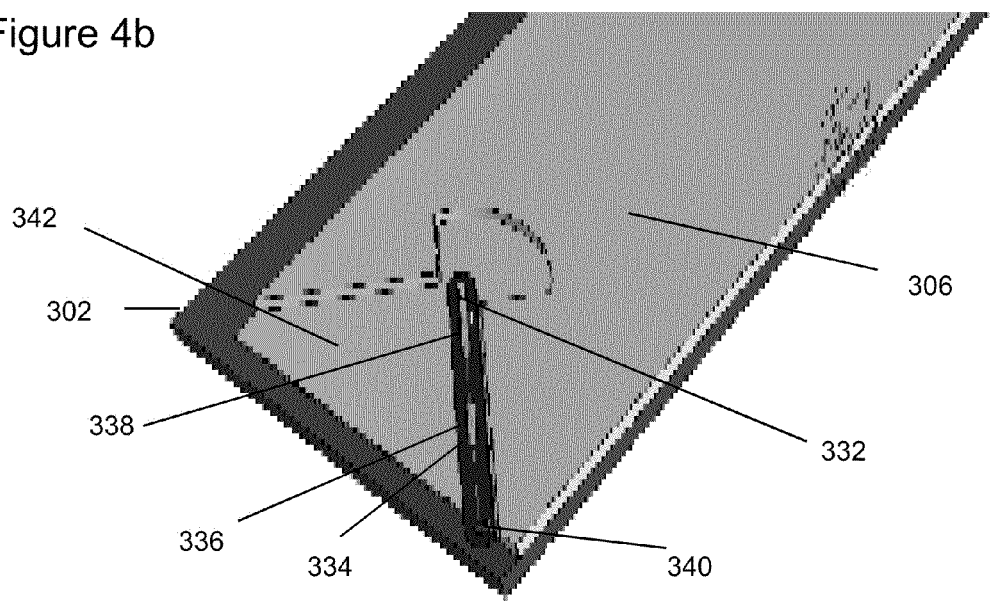

FIG. 4b shows the device 300 with the mechanism in a first, closed configuration.

Figure 4C:
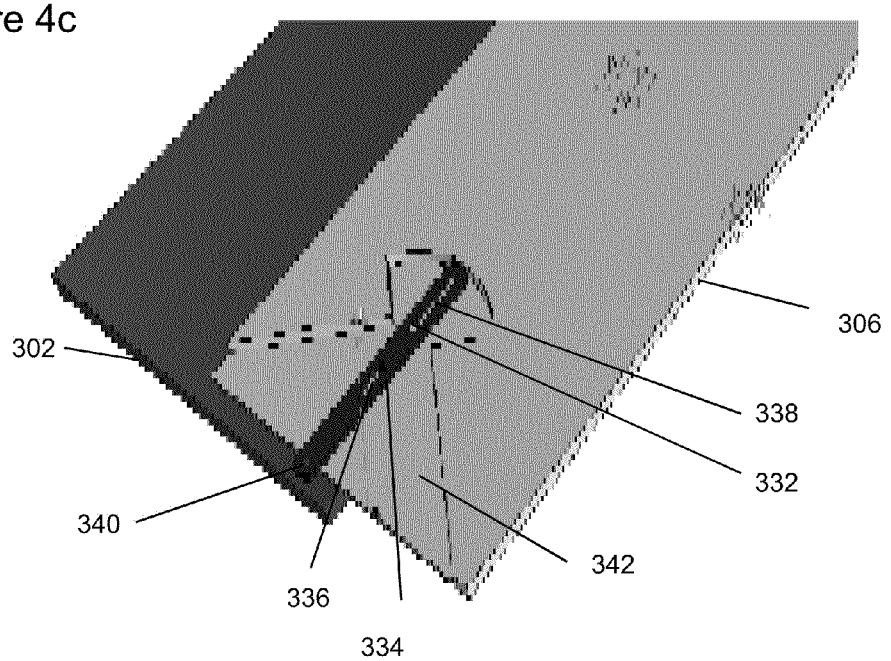

FIG. 4c shows the same device 300 in a half-open/half-closed configuration. As shown in FIG. 4c, an external user applied force has been applied to the first part 302 in a lateral direction. As the lateral force is applied to the first part 302, the pivotally connected lever 334 is caused to rotate about its pivot point 340 in order to retain the first base member pin 330 in the first longitudinal slot 336. When the lever 334 rotates in this way, it applies a force to the second part pin 332 that causes the second part 306 to move in the opposite direction to the first part 302. In this way, the user applied, external force applied to the first part 302 causes the mechanism to apply an internal force to the second part 306 that causes the first and second part 302, 306 to move in opposing directions with respect to the base member. An internal force may be considered as one that is provided by the mechanism/apparatus in response to a user applied external force.

As well as the lever pivoting about pivot point 340 relative to the first part, it may also be considered to pivot about the base member pin 330 such that the region of the lever to one side of the pin 330 applies a force to one part 302, 306 and the region of the lever to the other side of the base member pin 330 applies a force to the other part 302, 306.

Figure 4D:
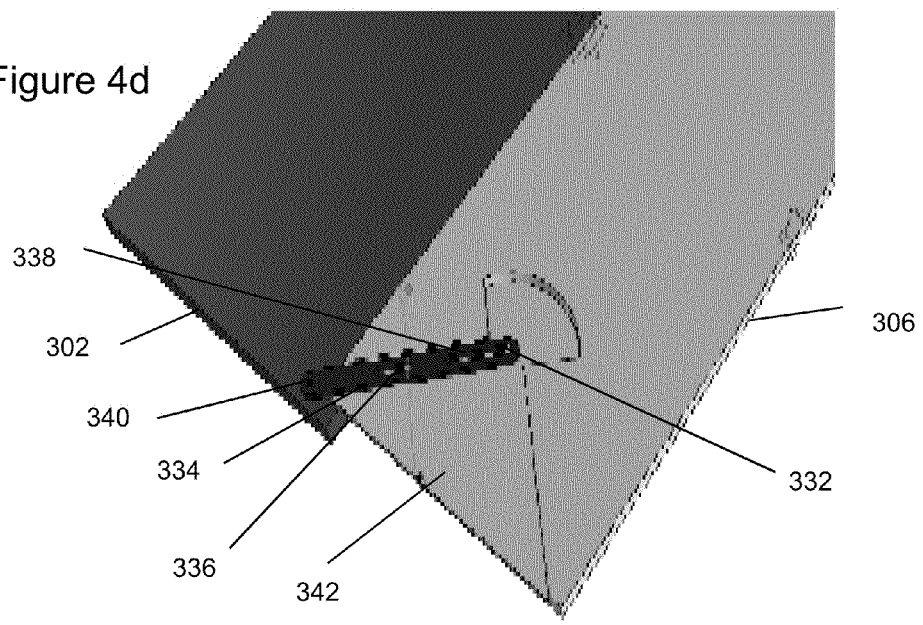

FIG. 4d illustrates the device 300 in a fully open, second configuration whereby the first part 302 has reached a maximum extent of its travel as defined by one or more of the cut-out 342 in the second part 306 and/or the length of the slots 336, 338 in the lever 334.

In some embodiments, the ratio of the movement of the two parts can be modified by changing the lever and pin geometry. After a sliding mechanism described herein, the apparatus could be configured to provide a tilting mechanism in order to tilt the display/user output interface.

In some embodiments, when the display module of the device is slid open, a mechanism (there are several possibilities of mechanism including gears, levers, over-centre springs and magnets) forces the keymat module toward the user. The reverse happens when the screen is slid closed.

In some embodiments, the distance moved by the slide can be the same as the size of the keymat that is revealed.

It will be appreciated to the skilled reader that the apparatus/device/server and/or other features of particular apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor and/or on one or more memories/processors.

It will be appreciated that the aforementioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

With reference to any discussion of processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An apparatus for a portable electronic device, the apparatus comprising a base member, a user input interface comprising a QWERTY input and a user output interface, the apparatus configured to provide a first configuration in which the user input interface is housed between the base member and the user output interface, and a second configuration in which the user input interface and the user output interface are configured to slide in opposing directions with respect to the base member between the first and second configurations and to overhang the base member in the second configuration and the user output interface is configured to be used in the first and second configurations.

2. The apparatus of claim 1, wherein the QWERTY input is activated for use on the user input interface when the apparatus is in the second configuration, and is not activated for use when the apparatus is in the first configuration.

3. The apparatus of claim 1, comprising a motion coupler coupled between the user input interface and the user output interface, wherein the motion coupler is configured to apply a force to the user input interface when an external force is applied to the user output interface to change the configuration of the apparatus, wherein the force applied to the user input interface is in the opposite direction to the force applied to the user output interface.

4. The apparatus of claim 3, wherein the motion coupler comprises one or more rack and pinion mechanisms.

5. The apparatus of claim 3, wherein the motion coupler comprises:
a first pin connected to the base;
a second pin connected to the user input interface; and
a lever pivotally connected to the user output interface, wherein the lever comprises one or more slots configured to accommodate the first and second pins, such that movement of the lever about its pivot point as the apparatus changes configuration causes movement of the user input interface and user output interface in opposite directions.

6. The apparatus of claim 1, wherein the user output interface is configured to conceal all of the user input interface when the apparatus is in the first configuration.

7. The apparatus of claim 1, wherein all of the user output interface is exposed when the apparatus is in the first configuration.

8. The apparatus of claim 1, wherein both of the user input interface and the user output interface overhang the base member when the apparatus is in the second configuration.

9. The apparatus of claim 8, wherein approximately half of the user input interface overhangs a first side of the base and approximately half of the user output interface overhangs a second side of the base when the apparatus is in the second configuration.

10. The apparatus of claim 1, wherein the user output interface is configured to provide portrait and landscape modes of use, wherein the first configuration provides the portrait mode of use, and the second configuration provides the landscape mode of use.

11. The apparatus of claim 10, wherein in the second configuration, the user input and output interfaces have been slid along a lateral axis, and the QWERTY input of the user input is for use with the landscape mode of use of the user output interface.

12. The apparatus of claim 10, wherein the user output interface is configured to align user output for viewing in an orientation in which the top of the user output is aligned with a longitudinal axis in the portrait mode of use.

13. The apparatus of claim 10, wherein the user output interface is configured to align user output for viewing in an orientation in which the top of the user output is aligned with the lateral axis in the landscape mode of use.

14. The apparatus of claim 1, wherein the user input interface is an input and output interface, and comprises a touch sensitive screen.

15. The apparatus of claim 1, wherein the user output interface is an input and output interface, and comprises a touch sensitive screen.

16. An apparatus for a portable electronic device, the apparatus comprising a base member, a user input interface, and a user output interface, the apparatus configured to provide a first configuration in which the user input interface is housed between the base member and the user output interface, and a second configuration in which the user input and output interfaces have been slid in opposing directions with respect to the base member to both overhang the base member.

17. The apparatus of claim 16, comprising mutually perpendicular longitudinal and lateral axes, and in the second configuration, the user input and output interfaces have been slid along the lateral axis.

18. The apparatus of claim 16, wherein the base member provides support for the user input and output interfaces in the second configuration.

19. An apparatus for a portable electronic device, the apparatus comprising a base member, a user input interface, and a user output interface the user output interface configured to provide portrait and landscape modes of use, the apparatus configured to provide a first configuration in which the user input interface is housed between the base member and the user output interface with the user output interface providing the portrait mode of use, and a second configuration in which the user input and output interfaces have been slid in opposing directions with respect to the base member and the user output interface provides the landscape mode of use.

20. A device comprising the apparatus according to claim 1.

21. A module for a device, the module comprising the apparatus of claim 1.

22. A method of assembling an apparatus according to claim 1.

23. A method of assembling a device according to claim 20.

24. An apparatus for a portable electronic device, the apparatus comprising a base member means, means for receiving user input comprising a QWERTY input means, and means for providing user output, the apparatus configured to provide a first configuration in which the means for receiving user input is housed between the base member means and the means for providing user output, and a second configuration in which the means for receiving user input and the means for providing user output are configured to slide in opposing directions with respect to the base member means between the first and second configuration and the means for providing user output is configured to be used in the first and second configuration.

25. The apparatus of claim 1, wherein the user input interface and user output interface are configured such that they can be tilted relative to each other to define a third configuration, wherein the third configuration is a further landscape mode of use.

* * * * *